(12) United States Patent
Mizuki et al.

(10) Patent No.: US 6,512,748 B1
(45) Date of Patent: Jan. 28, 2003

(54) RADIO PAGING SIGNAL CODING CONTROL SCHEME USING VARIABLE NUMBER OF LOGICAL CHANNELS ACCORDING TO PAGING SIGNAL TRAFFIC

(75) Inventors: Takayuki Mizuki, Hokkaido (JP); Setsuya Ohashi, Kanagawa-ken (JP); Yasushi Yamao, Kanagawa-ken (JP); Shogo Ito, Kanagawa-ken (JP)

(73) Assignee: NTT Mobile Communications Network Inc., Tokyo (JP)

(*) Notice: Subject to any disclaimer, the term of this patent is extended or adjusted under 35 U.S.C. 154(b) by 0 days.

(21) Appl. No.: 09/238,883

(22) Filed: Jan. 28, 1999

(30) Foreign Application Priority Data

Jan. 30, 1998 (JP) .......................... 10-019687

(51) Int. Cl.[7] .......................... H04Q 7/00; H04Q 7/20; H04B 7/212; H04B 7/00; H04J 3/06
(52) U.S. Cl. .................. 370/314; 370/510; 370/444; 455/458; 455/512
(58) Field of Search .................. 370/345, 442–444, 370/336, 312–314, 347, 468, 509, 510, 511, 512, 537, 431, 433, 462; 455/458, 450, 455, 464, 515, 452, 512

(56) References Cited

U.S. PATENT DOCUMENTS

| | | | | |
|---|---|---|---|---|
| 5,533,094 A | * | 7/1996 | Sanmugam | 379/57 |
| 5,561,701 A | * | 10/1996 | Ichikawa | 340/7.26 |
| 5,726,640 A | * | 3/1998 | Jones et al. | 340/825.22 |
| 5,757,245 A | * | 5/1998 | Song | 332/100 |
| 5,966,662 A | * | 10/1999 | Murto | 455/458 |
| 6,014,556 A | * | 1/2000 | Bhatia et al. | 455/404 |
| 6,163,699 A | * | 12/2000 | Naor et al. | 455/453 |
| 6,253,061 B1 | * | 6/2001 | Helferich | 455/31.2 |

FOREIGN PATENT DOCUMENTS

| | | |
|---|---|---|
| JP | 5-336061 | 12/1993 |
| JP | 8-509349 | 10/1996 |
| JP | 9-327054 | 12/1997 |

* cited by examiner

*Primary Examiner*—Kwang Bin Yao
*Assistant Examiner*—Hanh Nguyen
(74) *Attorney, Agent, or Firm*—Oblon, Spivak, McClelland, Maier & Neustadt, P.C.

(57) ABSTRACT

A radio paging signal coding control scheme capable of improving the reception characteristic of the receiver by carrying out a coding control to determine logical channels for accommodating paging signals such that the transmission rate equivalently becomes as low as possible according to the paging signal traffic, without interrupting the paging signal coding processing while maintaining the combination of transmission rate and modulation scheme for frames, is disclosed. In the case of using prescribed transmission rate and N-valued modulation scheme, logical channels to be used for transmission of paging signals among a plurality of available logical channels are determined by setting priority orders among a plurality of available logical channels such that a number of states of modulated signals becomes less than N when paging signal traffic is small.

8 Claims, 12 Drawing Sheets

FIG.10A

TRAFFIC AMOUNT ≤ $\frac{1}{3}$ (TRANSMISSION CAPACITY)

TRANSMISSION ORDER →

| CHANNEL A | - - - - - | 1 | 0 | 1 | 0 | |
|---|---|---|---|---|---|---|
| CHANNEL B | - - - - - | 0 | 0 | 0 | 0 | - - - - - |
| CHANNEL C | - - - - - | 0 | 0 | 0 | 0 | |

ΔF ——— 100 ——— 100
5/7 ΔF
3/7 ΔF
1/7 ΔF
-1/7 ΔF
-3/7 ΔF
-5/7 ΔF
-ΔF ——— 000 ——— 000

FIG.10B $\frac{1}{3}$ (TRANSMISSION CAPACITY) < TRAFFIC AMOUNT ≤ $\frac{2}{3}$ (TRANSMISSION CAPACITY)

TRANSMISSION ORDER →

| CHANNEL A | - - - - - | 1 | 1 | 0 | 0 | |
|---|---|---|---|---|---|---|
| CHANNEL B | - - - - - | 0 | 1 | 1 | 0 | - - - - - |
| CHANNEL C | - - - - - | 0 | 0 | 0 | 0 | |

ΔF ——— 100
5/7 ΔF
3/7 ΔF ——— 110
1/7 ΔF
-1/7 ΔF
-3/7 ΔF ——— 010
-5/7 ΔF
-ΔF ——— 000

TRAFFIC AMOUNT $\leq \frac{1}{3}$(TRANSMISSION CAPACITY)

$\frac{1}{3}$(TRANSMISSION CAPACITY) < TRAFFIC AMOUNT $\leq \frac{2}{3}$(TRANSMISSION CAPACITY)

TRAFFIC AMOUNT > $\frac{2}{3}$(TRANSMISSION CAPACITY)

RADIO PAGING SIGNAL CODING CONTROL SCHEME USING VARIABLE NUMBER OF LOGICAL CHANNELS ACCORDING TO PAGING SIGNAL TRAFFIC

BACKGROUND OF THE INVENTION

1. Field of the Invention

The present invention relates to a radio paging signal coding control scheme for carrying out the coding control in a radio paging system, and more particularly, to a radio paging signal coding control scheme to be used in the radio paging scheme in which logical channels containing a necessary number of coded paging signals are multiplexed into one frame, and time series digital signals in which a plurality of frames are time division multiplexed are used as modulation signals in modulating and transmitting a carrier according to prescribed transmission rate and N-valued modulation scheme.

2. Description of the Background Art

A known high speed radio paging scheme includes a FLEX-TD (FLEX-Time Diversity) scheme (ARIB (Association of Radio Industries and Businesses (JAPAN)) standard specification: RCRSTD-43A), for example. In this scheme, there are four modes for a combination of transmission rate and modulation scheme, including a 1600 bps/2-valued FSK (Frequency Shift Keying) modulation mode, a 3200 bps/2-valued FSK modulation mode, a 3200 bps/4-valued FSK modulation mode, and a 6400 bps/4-valued FSK modulation mode. These modes can be set frame by frame as shown in FIG. 1, where the setting information is contained in the frame information inserted at a synchronization signal portion. The receiver can receive, demodulate and decode the subsequent bit sequences according to a combination of transmission rate and modulation scheme indicated by that frame information.

In each frame, one, two or four logical channels each having a rate of 1600 bps are multiplexed together according to the above described modes. In this standard specification, the logical channel is called a phase, and phases available for transmission of the paging signal information are phase A alone for the 1600 bps/2-valued FSK modulation mode, phases A and C for the 3200 bps/2-valued FSK modulation mode and the 3200 bps/4-valued FSK modulation mode, and phases A, B, C and D for the 6400 bps/4-valued FSK modulation mode, as shown in FIG. 1.

Schemes for multiplexing phases are shown in FIG. 2A and FIG. 2B for the 3200 bps/2-valued FSK modulation mode and the 6400 bps/4-valued FSK modulation mode.

FIG. 2A shows the case of the 3200 bps/2-valued FSK modulation mode, where the multiplexing is carried out in units of two bits information, one bit from each of the phase A and the phase C. As shown in FIG. 2A, the 2-valued modulated symbol is generated by alternately arranging information bits of the phase A and the phase C. The modulated symbol rate is equal to the coding rate which is 3200 bps. A relationship between the phases and the modulated signal states indicates that the frequency shift of $+\Delta F$ corresponds to the code "1" and the frequency shift o $-\Delta F$ corresponds to the code "0".

FIG. 2B shows that case of the 6400 bps/4-valued FSK modulation mode, where the multiplexing is carried out in units of four bits information, one bit from each of the phases A, B, C and D. As shown in FIG. 2B, the 4-valued modulated symbol is generated from information bits of the phase A and the phase B, while the 4-valued modulated symbol is generated from information bits of the phase C and the phase D. The modulated symbol rate is equal to a half of the coding rate which is 3200 bps. A relationship between the phases and the modulated signal states indicates that the frequency shift of $+\Delta F$ corresponds to the code "10", the frequency shift of $+(\frac{1}{3})\Delta F$ corresponds to the code "11", the frequency shift of $-(\frac{1}{3})\Delta F$ corresponds to the code "01", and the frequency shift of $-\Delta F$ corresponds to the code "00".

When FIG. 2A and FIG. 2B are compared, it can be seen that the modulated symbol rate is the same in both cases but the signal-to-signal distance (a difference in the frequency shift) between neighboring modulated signals is larger in the case of FIG. 2A. Consequently, errors due to influences such as thermal noises are less likely to occur in the case of FIG. 2A with the lower transmission rate and therefore the reception characteristic is better in the case of FIG. 2A.

In the above described scheme, the number of multiplexed channels increases and more paging traffics can be accommodated for the higher transmission rate so that the subscriber capacity becomes larger. On the other hand, as mentioned above, the reception characteristic at the receiver becomes better for the lower transmission rate. As such, the subscriber capacity and the reception characteristic impose mutually reciprocal requirements so that, as a compromise, it is customary to select the minimum necessary transmission rate that can accommodate the maximum value of the paging traffic for each service providing area.

Now, the coding control scheme in the conventional coding control device will be described with references to FIG. 3 and FIG. 4. FIG. 3 shows a conventional radio paging signal coding control device which comprises a paging data storage unit 1 that receives paging data 10, a frame allocation processing unit 2, a frame information memory 4, a phase allocation unit 5, an empty word detection unit 6, a coding processing unit 7, a transmission buffer storage unit 8 and a transmission unit 9 from which the paging data are transmitted to a paging signal transmission base station (not shown).

In this conventional coding control device, when the phase is not particularly specified in the received paging data, the phase allocation within the frame, that is, which phase among the multiplexed phases is to be used in accommodating the paging signals, is determined by randomly allocating and coding all the phases at the phase allocation unit 5 regardless of the paging signal traffic. For example, when the frame is set to the 6400 bps/4-valued FSK modulation mode by the frame information memory 4, the paging signals are coded and accommodated in all four phases starting immediately after the synchronization signal of one frame, as shown in FIG. 4.

For this reason, when the paging traffic is small, the paging signal information is accommodated in a hatched portion of FIG. 4 and the modulated signal state takes one of the four values shown in FIG. 2B. Also, empty words in which no paging signal information is accommodated are arranged at the remaining portion of the frame. Namely, only a part of the transmission time has been actually contributing to the information transmission, and much of the transmission power has been wasteful.

Thus in the conventional coding control scheme, the transmission is carried out by using all the phases that can accommodate the maximum value of the paging traffic regardless of how large the paging traffic is, so that the modulated signal state has to obey the prescribed combination of transmission rate and modulation scheme and it has not been possible to expect a better reception characteristic.

Note that the paging traffic varies in time, so that it is also possible to change the combination of transmission rate and modulation scheme at times where the traffic is large and at the other times, but in the case of changing this combination, there is a need for the coding device to change the information within the synchronization signal so that it is necessary to change the basic frame configuration and there is a need for the coding device to interrupt the coding of the paging signals until the changing of the basic frame configuration is completed.

As described, there has been a problem that the higher transmission rate can increase the subscriber capacity but it also degrades the reception characteristic of the receiver, and in the conventional coding control scheme, it has only been possible to realize the reception characteristic that is dependent on the transmission rate selected in accordance with the maximum traffic, regardless of the variation in time of the paging traffic.

Also, when the paging signal traffic increases instantaneously, if the combination of transmission rate and modulation scheme is to be changed in accordance with the traffic amount, there arises a problem in view of the service in that it becomes impossible to continue the coding processing despite of the fact that the traffic has increased so that it becomes impossible to receive paging signals, and in addition there also arises a problem that the traffic that can be accommodated will be rather reduced because empty portions occur along a time direction in the frame.

SUMMARY OF THE INVENTION

It is therefore an object of the present invention to provide a radio paging signal coding control scheme capable of improving the reception characteristic of the receiver by carrying out a coding control to determine logical channels for accommodating paging signals such that the transmission rate equivalently becomes as low as possible according to the paging signal traffic, without interrupting the paging signal coding processing while maintaining the combination of transmission rate and modulation scheme for frames.

According to one aspect of the present invention there is provided a radio paging signal coding control device, comprising: a processing unit for multiplexing logical channels containing coded paging signals into one frame, and modulating and transmitting a carrier using time series digital signals in which a plurality of frames are time division multiplexed as modulation signals, according to prescribed transmission rate and N-valued modulation scheme, where N is an integer; and a control unit for controlling the processing unit by determining logical channels to be used for transmission of paging signals among a plurality of available logical channels, by setting priority orders among said plurality of available logical channels such that a number of states of modulated signals becomes less than N when paging signal traffic is small.

According to another aspect of the present invention there is provided a radio paging signal coding control device, comprising: a processing unit for multiplexing logical channels containing coded paging signals into one frame, and modulating and transmitting a carrier using time series digital signals in which a plurality of frames are time division multiplexed as modulation signals, according to prescribed transmission rate and N-valued modulation scheme, where N is an integer; and a control unit for controlling the processing unit by allocating M logical channels to be used for transmission of paging signals at high priority among a plurality of available logical channels, where M is an integer less than N, such that the paging signals are accommodated in said M logical channels at high priority.

According to another aspect of the present invention there is provided a radio paging signal coding control method, comprising the step of: processing paging signals by multiplexing logical channels containing coded paging signals into one frame, and modulating and transmitting a carrier using time series digital signals in which a plurality of frames are time division multiplexed as modulation signals, according to prescribed transmission rate and N-valued modulation scheme, where N is an integer; and controlling the processing step by determining logical channels to be used for transmission of paging signals among a plurality of available logical channels, by setting priority orders among said plurality of available logical channels such that a number of states of modulated signals becomes less than N when paging signal traffic is small.

According to another aspect of the present invention there is provided a radio paging signal coding control method, comprising the steps of: processing paging signals by multiplexing logical channels containing coded paging signals into one frame, and modulating and transmitting a carrier using time series digital signals in which a plurality of frames are time division multiplexed as modulation signals, according to prescribed transmission rate and N-valued modulation scheme, where N is an integer; and controlling the processing step by allocating M logical channels to be used for transmission of paging signals at high priority among a plurality of available logical channels, where M is an integer less than N, such that the paging signals are accommodated in said M logical channels at high priority.

Other features and advantages of the present invention will become apparent from the following description taken in conjunction with the accompanying drawings.

BRIEF DESCRIPTION OF THE DRAWINGS

FIGS. 10A, 10B and 10C are diagrams showing exemplary radio signal modulation used in the second embodiment of the present invention.

DETAILED DESCRIPTION OF THE PREFERRED EMBODIMENTS

Referring now to FIGS. 5 to FIG. 9, the first embodiment of a radio paging signal coding control scheme according to the present invention will be described in detail.

Figure 5:
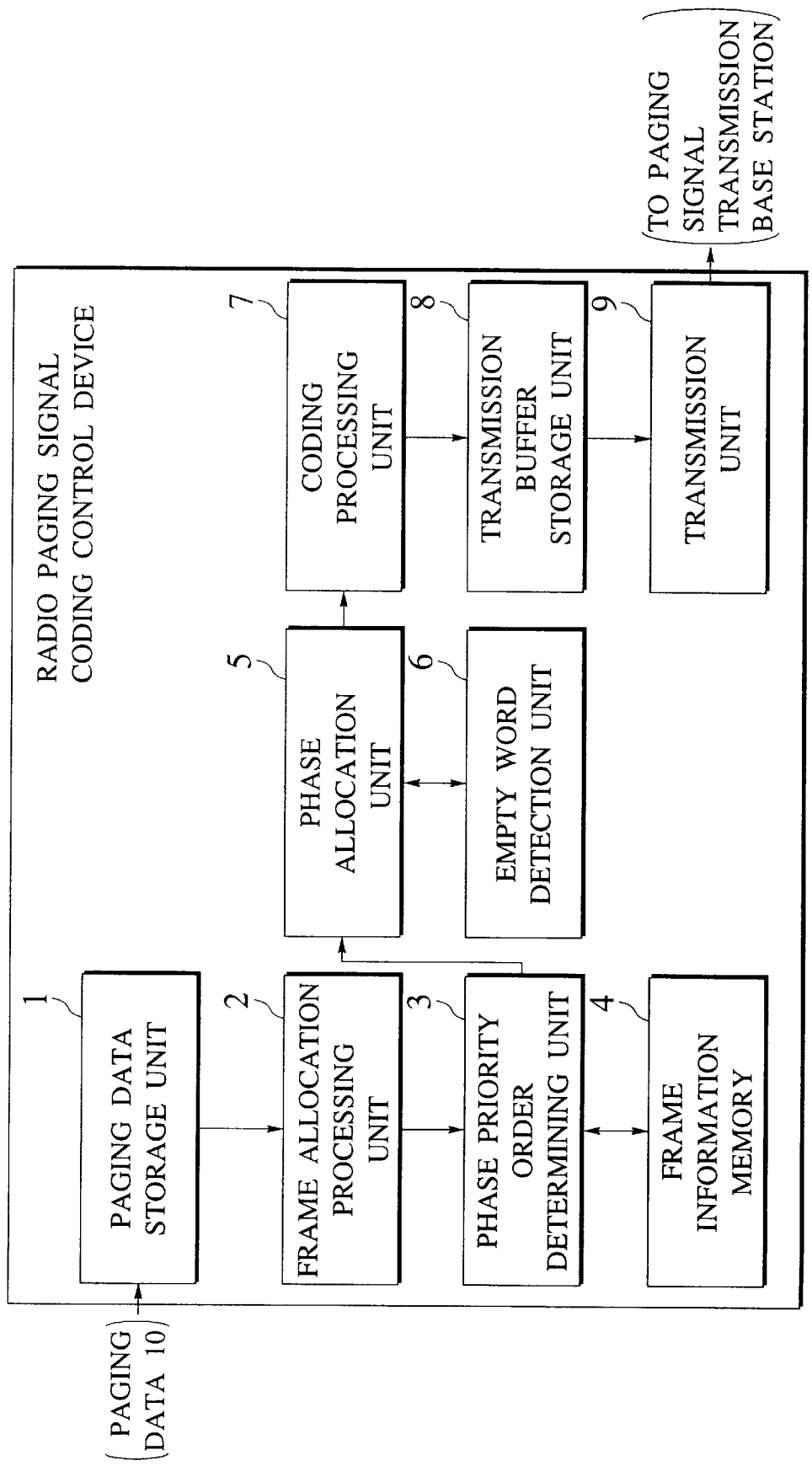
FIG. 5 is a block diagram of a radio paging signal coding control device according to the first embodiment of the present invention.

FIG. 5 shows an exemplary configuration of a radio paging signal coding control device according to this first embodiment. In this radio paging signal coding control device of FIG. 5, a paging data storage unit 1 stores randomly generated paging data 10. A frame allocation processing unit 2 allocates a frame for accommodating each paging data stored in the paging data storage unit 1 according to a frame number contained in each paging data. A phase priority order determining unit 3 reads out a combination of transmission rate and modulation scheme for each frame from a frame information memory 4, and determines priority orders among phases for carrying out coding. A phase allocation unit 5 determines phases that are capable of carrying out coding according to the priority orders, using an empty word state within each phase detected by an empty word detection unit 6. A coding processing unit 7 carries out coding of the paging signals in the determined phases, and stores the coded paging signals into a transmission buffer storage unit 8. The stored data are then transferred through a transmission unit 9 to each base station.

Figure 6:
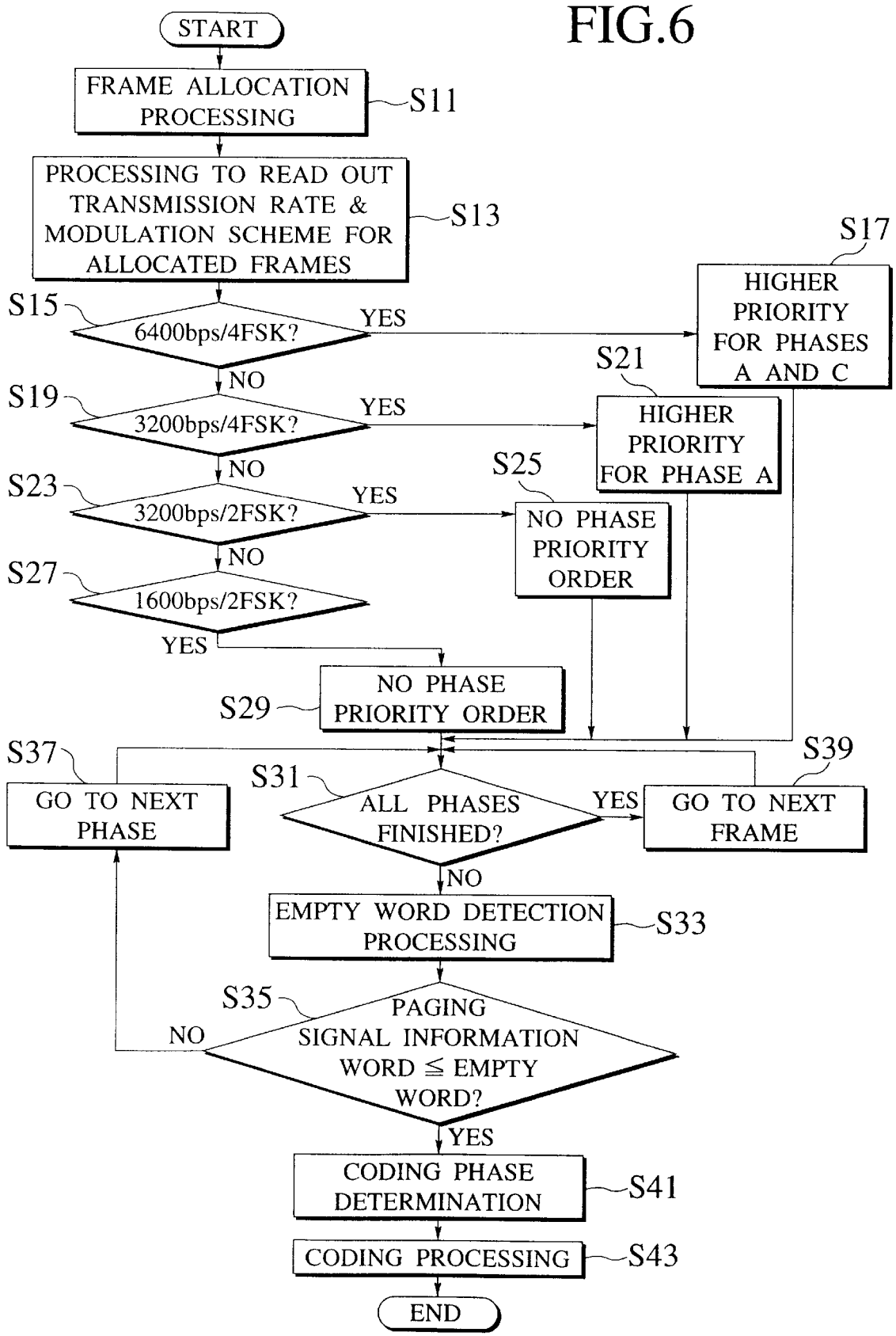
FIG. 6 is a flow chart of the operation by the radio paging signal coding control device of FIG. 5.

FIG. 6 shows a processing procedure of the radio paging signal coding control device of FIG. 5 up to the coding processing. In this first embodiment, when the phase is not particularly specified in the received paging data, the phase allocation within each frame is made in such a manner that the priority orders are assigned to the phases to be used so as to make the number of states of the modulated signals smaller than N of the N-valued modulation scheme to be used as much as possible. For example, in the case of using 6400 bps/4-valued FSK modulation, four phases of phases A, B, C and D are available for transmission of paging signal information, but in this first embodiment, the coding control is made such that only two phases of phases A and C among these four phases will be used at higher priority.

In the processing shown in FIG. 6, the paging data are allocated to frames for accommodating them according to the frame numbers that are contained in the paging data stored in the paging data storage unit 1 (step S11), and a combination of transmission rate and modulation scheme for these frames is read out from the frame information memory 4 (step S13). Then, whether the read out combination of transmission rate and modulation scheme is 6400 bps/4-valued FSK or not (step S15), 3200 bps/4-valued FSK or not (step S19), 3200 bps/2-valued FSK or not (step S23), 1600 bps/4-valued FSK or nor (step S27), is sequentially checked.

When the read out combination of transmission rate and modulation scheme is 6400 bps/4-valued FSK a higher priority is given to the phase A and the phase C (step S17), when it is,3200 bps/4-valued FSK a higher priority is given to the phase A (step S21), when it is 3200 bps2-valued FSK or 1600 bps/4-valued FSK no phase priority orders are specified (steps S25, S29), and the processing proceeds to the step S31.

At the step S31, whether the processing for detecting the empty word state within a phase according to the read out priority orders has been finished for all the phases or not is checked, and if it has not been finished, the empty word state within a phase is detected (step S33) and whether the detected empty word is larger than the paging signal information word or not is checked (step S35). If the empty word is larger, this phase is determined as a phase capable of carrying out coding (step S41), and the aging signals are coded in this determined phase (step S43). Then, the coded paging signals are stored in the transmission buffer storage unit 8 and the stored data are transferred to each base station from the transmission unit 9.

If the empty word is judged as not larger than the paging signal information word at the step S35, the processing proceeds to a next phase (step S37) and the processing from the step S31 on is repeated for the next phase. Also, if the above processing is judged as finished for all the phases at the step S31, the processing proceeds to a next frame among the allocated frames (step S39) and the processing from the step S31 on is repeated for the next frame.

Figure 4:
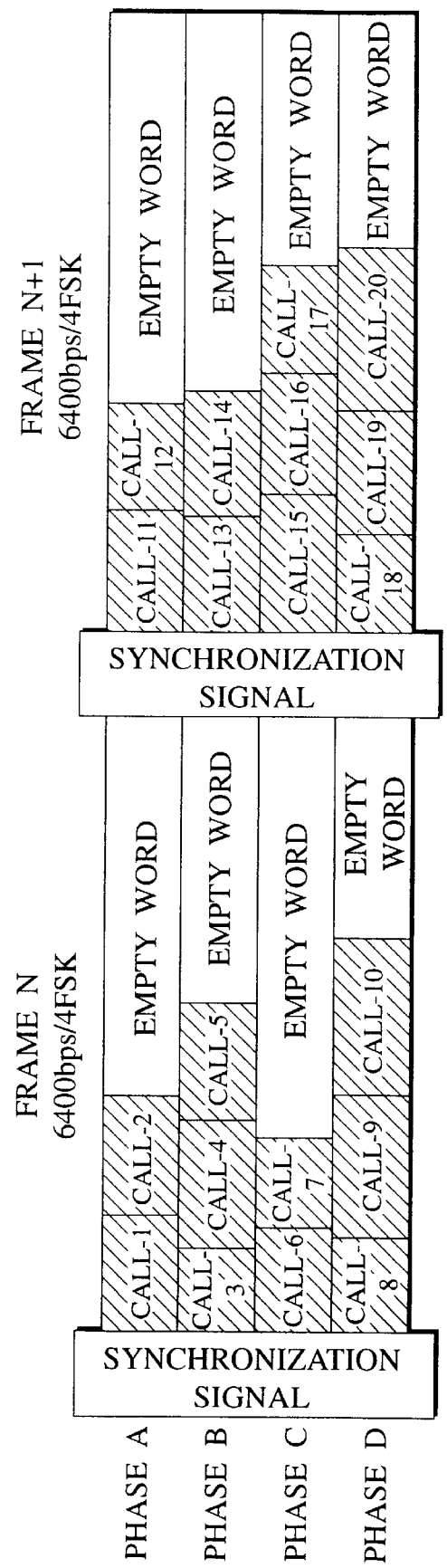
FIG. 4 is a diagram showing an exemplary manner of accommodating paging signals in a frame according to the conventional FLEX-TD scheme.
Figure 7:
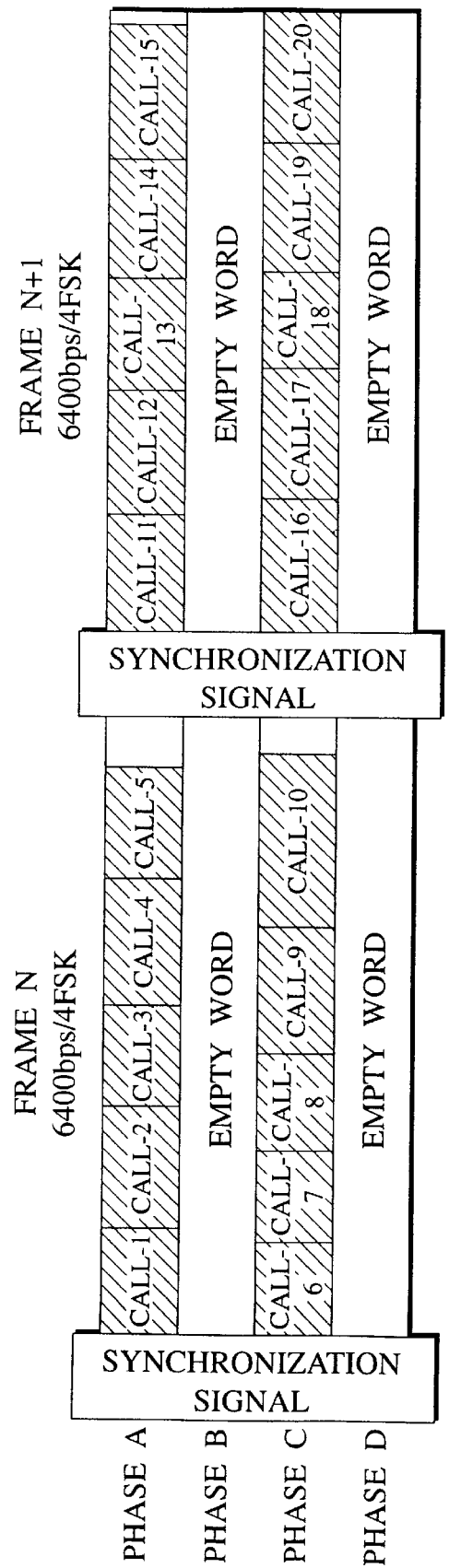
FIG. 7 is a diagram showing an exemplary manner of accommodating paging signals in a frame according to the first embodiment of the present invention (when the traffic amount $\leq 50\%$ of the transmission capacity).

FIG. 7 shows an exemplary manner of accommodating paging signals in a frame in this first embodiment, for an exemplary of the paging signal traffic (call-1 to call-20) used in FIG. 4 described above. In this case, only two phases of phases A and C are used at higher priority among four phases of phases A, B, C and D, so that the paging signal information is contained only in the hatched portions of the phases A and C, and not in the phases B and D. Here, it is assumed that call-1 to call-10 are calls to be allocated to the frame N and call-11 to call-20 are calls to be allocated to the frame N+1. If there are only call-1 to call-10, these calls will be accommodated into the phases A and C of the frame N while the frame N+1 is left empty. If there are only call-1 to call-5, all of these calls may be accommodated into the phase A or the phase C of the frame N, or some of them may be accommodated into the phase A of the frame N while the others are accommodated into the phase C of the frame N.

Figure 1:
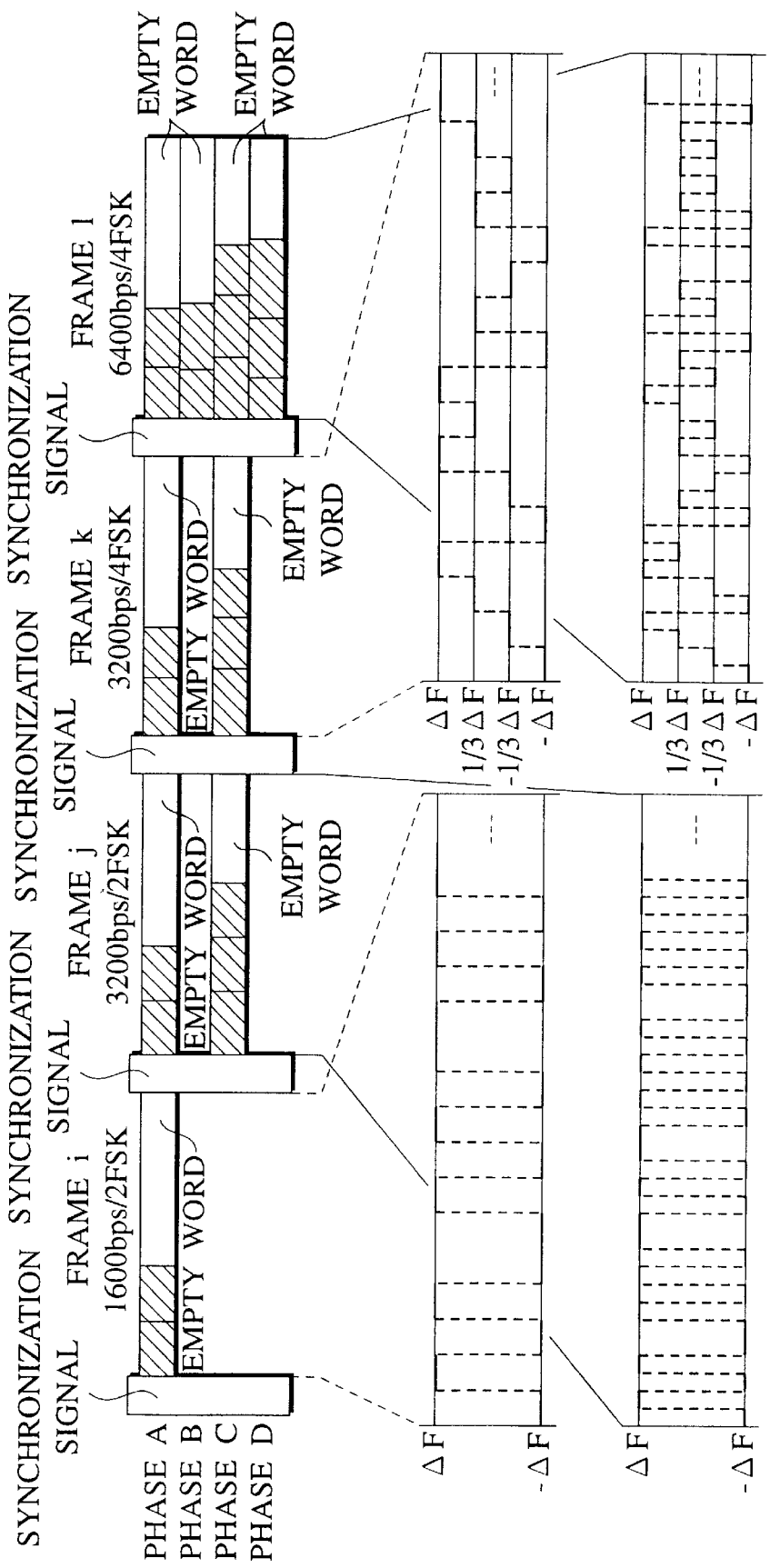
FIG. 1 is a diagram showing an exemplary frame format in the conventional FLEX-TD scheme.
Figure 2A:
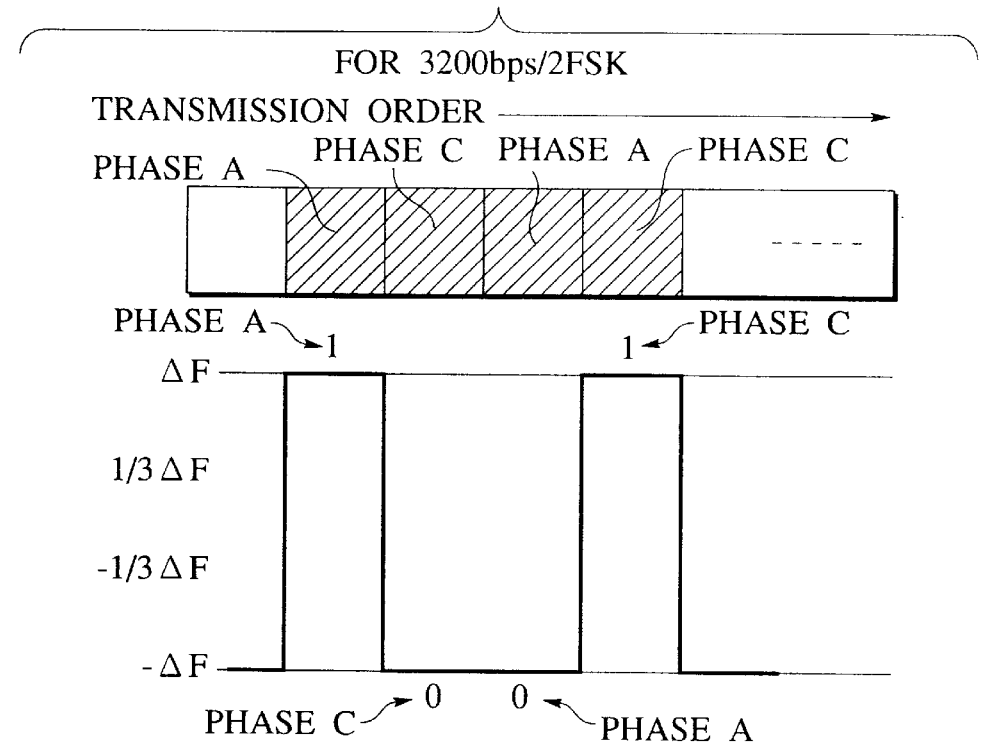
FIGS. 2A and 2B are diagrams showing exemplary radio signal modulation used in the conventional FLEX-TD scheme.
Figure 2B:
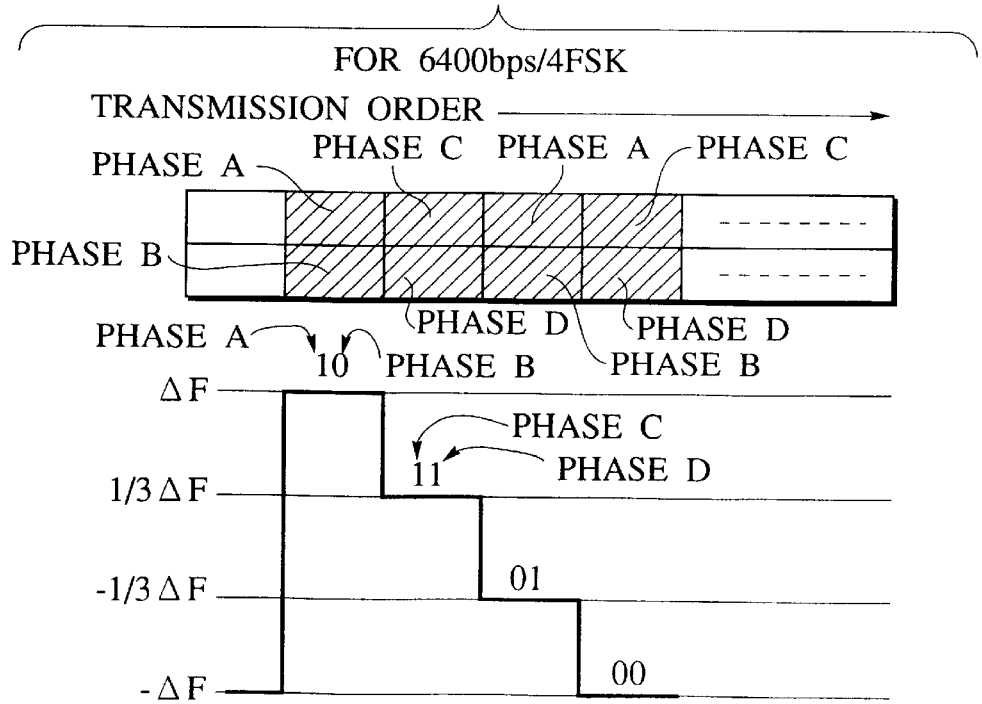
Figure 3:
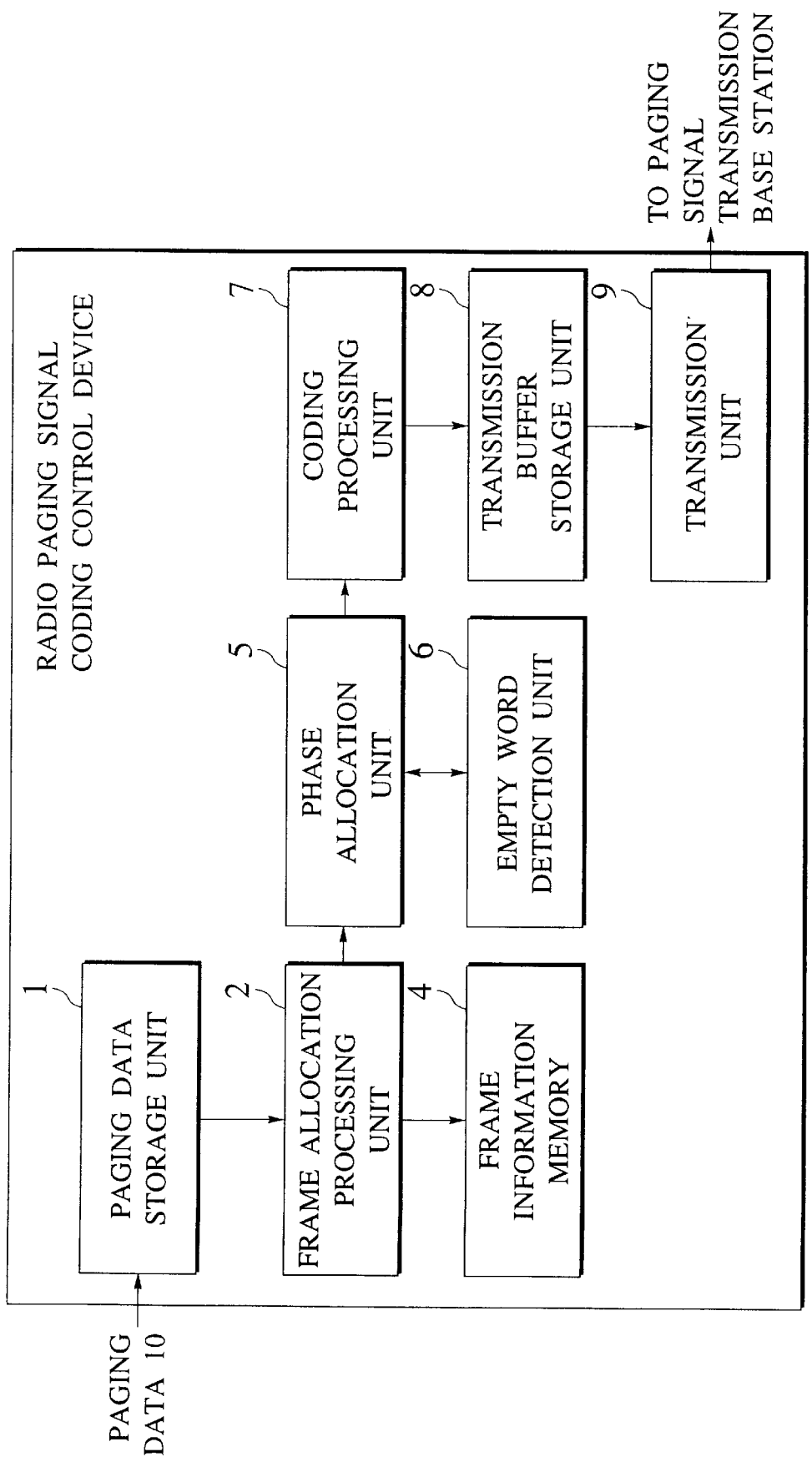
FIG. 3 is a block diagram of a conventional radio paging signal coding control device.
Figure 8:
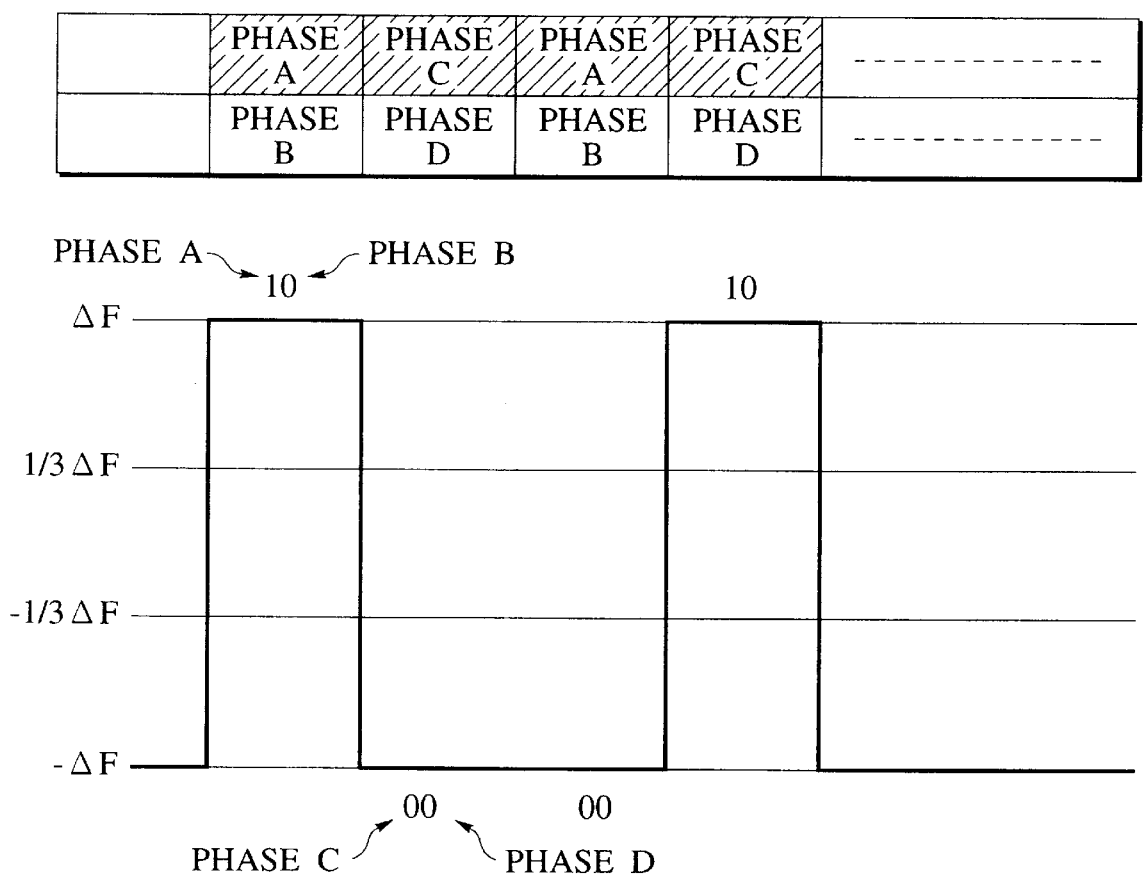
FIG. 8 is a diagram showing an exemplary radio signal modulation used in the first embodiment of the present invention for the case shown in FIG. 7.

As described above with reference to FIG. 2B, according to the conventional phase multiplexing scheme in the case of 6400 bps/4-valued FSK modulation where all the phases are allocated randomly, the modulated signals take four states (frequency shifts). In contrast, when only two phases of phases A and C are used and the remaining phases B and D are set to be all "0" according to this first embodiment, the modulated signals take only two states ($+\Delta F$, $-\Delta F$) that are separated by the maximum signal-to-signal distance, so that the modulated signals become equivalent to 3200 bps/2-valued FSK modulated signals, as indicated in FIG. 8. It can easily be seen that the signal states shown in FIG. 8 are equivalent to those of the 3200 bps/2-valued FSK modulated signals shown in FIG. 2A.

Consequently, using two phases of phases A and C at higher priority, the transmission rate can be equivalently reduced to a half in the case where the paging signal traffic is less than or equal to 50% of the transmission capacity, so that the reception characteristic can be improved.

Figure 9:
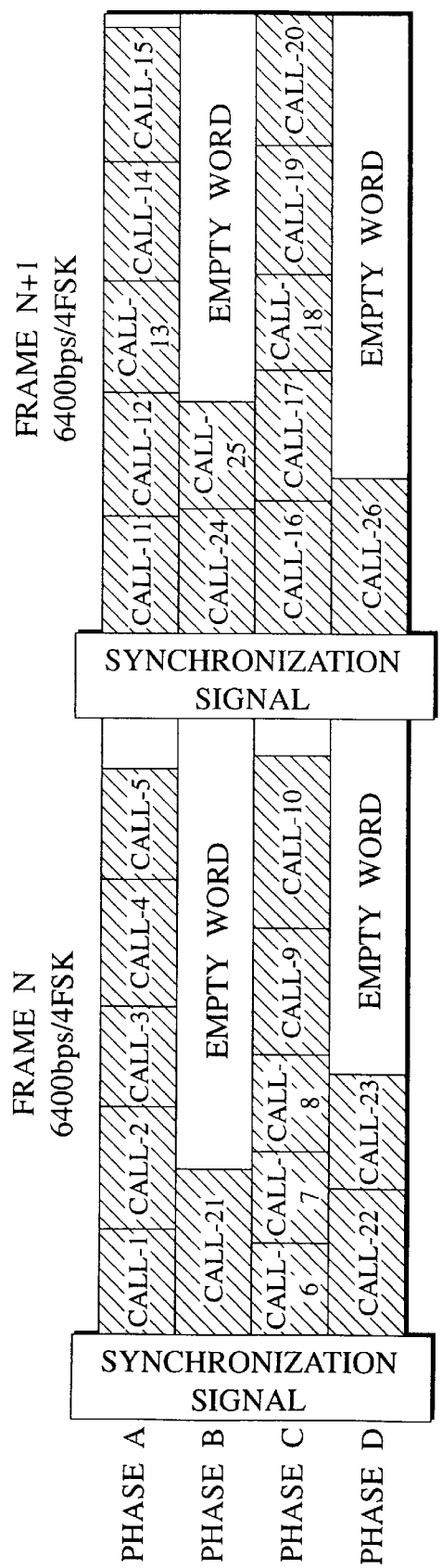
FIG. 9 is a diagram showing an exemplary manner of accommodating paging signals in a frame according to the first embodiment of the present invention (when the traffic amount>50% of the transmission capacity).

When the paging signal traffic within a frame exceeds 50% of the transmission capacity, the traffic in excess of 50% will be accommodated in the phases B and D as well, as indicated in FIG. 9. At time sections where the paging signal information is also accommodated in the phases B and D the modulated signals takes four states (frequency shifts) so that there is no reception characteristic improvement. However, at the other section the modulated signals continue to be equivalent to 3200 bps/2-valued FSK modulated signals so that the reception characteristic can be improved. Consequently, the present invention is effective even in the case shown in FIG. 9.

Note that the above description is directed to the case of using the 6400 bps/4-valued FSK modulation mode in the FLEX-TD scheme, but the present invention is equally applicable to the case of using the 3200 bps/4-valued FSK modulation mode to achieve the similar reception characteristic improvement effect. In the case of the 3200 bps/4-valued FSK modulation mode, two phases of phases A and C are available but the coding control is made such that the phase A will be used at higher priority. When the paging signal traffic is small, the modulated signals can be reduced to two states (+ΔF, −ΔF) that are separated by the maximum signal-to-signal distance, so that the modulated signals become equivalent to the 1600 bps/2-valued FSK modulated signals.

Referring now to FIGS. 10A to 10C and FIGS. 11A to 11C, the second embodiment of a radio paging signal coding control scheme according to the present invention will be described.

The present invention is applicable not only to the FLEX-TD scheme as described above but to the general radio paging scheme in which logical channels containing coded paging signals are multiplexed into one frame, and time series digital signals in which a plurality of frames are time division multiplexed are used as modulation signals in modulating and transmitting a carrier according to prescribed transmission rate and N-valued modulation scheme, for the similar effect of improving the reception characteristic of the receiver.

As an example, the case of the radio paging scheme in which three logical channels containing the coded paging signals are to be multiplexed into one frame and the carrier is to be modulated and transmitted using the 8-valued FSK modulation will be described in this second embodiment.

Figure 10C:
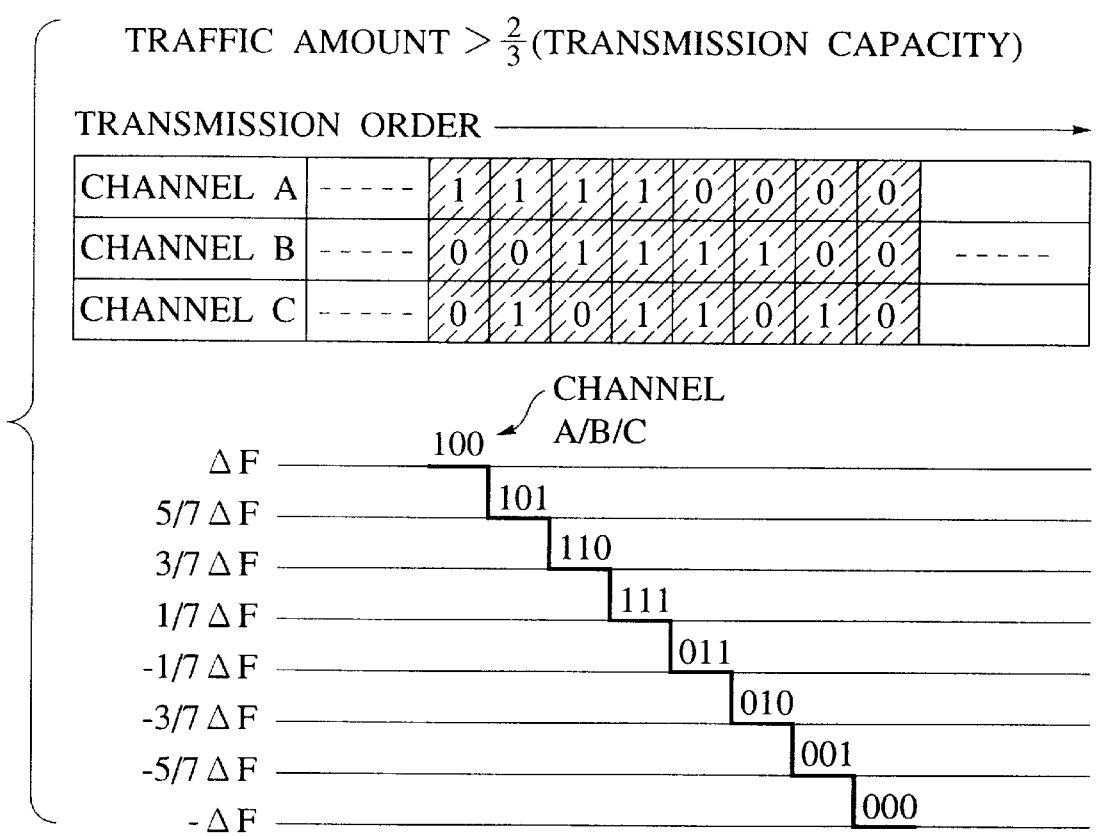

In this case, an exemplary relationship between the logical channels and the radio signal modulation is shown in FIG. 10C. Namely, the multiplexing is realized in units of a total three bits information formed by taking one bit from each of the three logical channels A, B and C, and 8-valued modulated symbols are generated. As indicated in FIG. 10C, the modulated signals indicate a code "100" at the frequency shift +ΔF, a code "101" at the frequency shift +(5/7)ΔF, a code "110" at the frequency shift +(3/7)ΔF, a code "111" at the frequency shift +(1/7)ΔF, a code "011" at the frequency shift −(1/7)ΔF, a code "010" at the frequency shift −(3/7)ΔF, a code "001" at the frequency shift −(5/7)ΔF, and a code "000" at the frequency shift −ΔF.

Figure 11A:
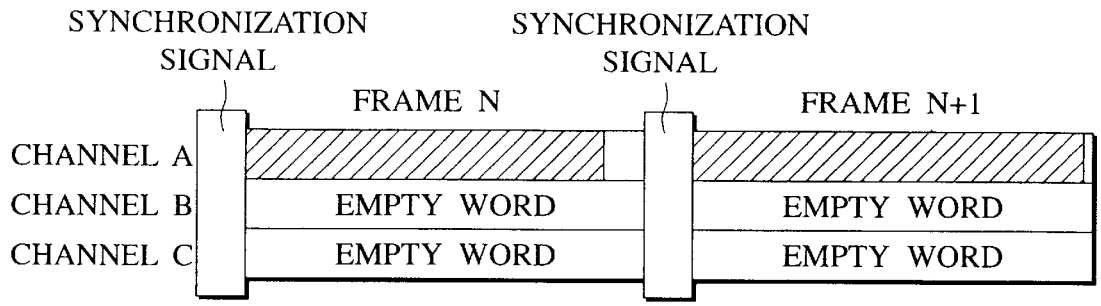
FIGS. 11A, 11B and 11C are diagram showing exemplary manners of accommodating paging signals in a frame according to the second embodiment of the present invention.
Figure 11B:
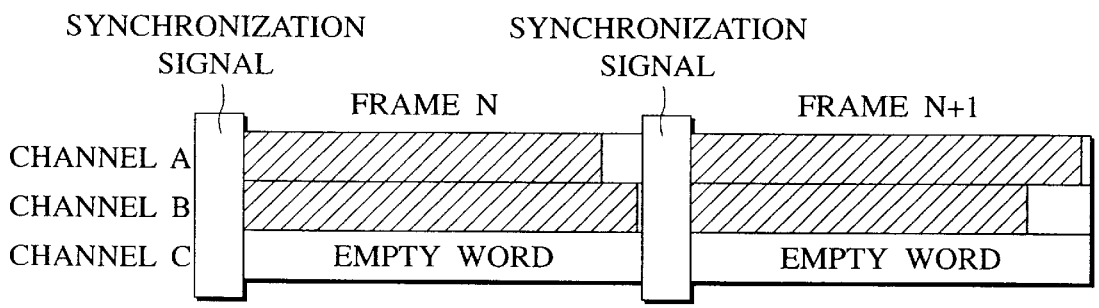
Figure 11C:
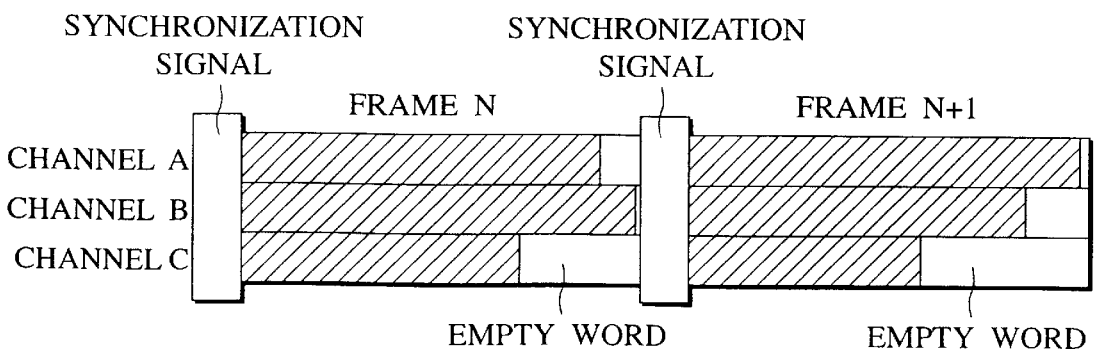

In this second embodiment, when the priority orders among the logical channels to be used for transmission of paging signals are set as A (highest priority)→B (second highest priority)→C (lowest priority) according to the present invention, the paging signals can be accommodated into a frame as shown in FIGS. 11A to 11C, where FIG. 11A is for the case where the traffic amount is less than or equal to one third of the transmission capacity, FIG. 11B is for the case where the traffic amount is greater than one third but less than or equal to two third of the transmission capacity, and FIG. 11C is for the case where the traffic amount is greater than two third of the transmission capacity. The modulated signal states corresponding to these three cases are shown in FIGS. 10A, 10B and 10C, respectively.

In the case of FIG. 11, the paging signals are contained only in the logical channel A, and not in the logical channels B and C, so that the lower two bits are "00" for all the modulated signals. Consequently, the modulated signals take two states (+ΔF, −ΔF) that are separated by the maximum signal-to-signal distance, so that the modulated signals become equivalent to the 2-valued FSK modulated signals. This implies that the transmission rate can be equivalently reduced to 1/3 so that the reception characteristic can be improved considerably in this case.

In the case of FIG. 11B, the paging signals are contained only in the logical channels A and B, and not in the logical channel C, so that the lowest bit is "0" for all the modulated signals. Consequently, the modulated signals take four states (+ΔF, +(3/7)ΔF, −(3/7)ΔF, −ΔF), so that the modulated signals become equivalent to the 4-valued FSK modulated signals. This implies that the transmission rate can be equivalently reduced to 2/3. In this case, the signal-to-signal distance is (4/7)ΔF or more which is twice as much as the signal-to-signal distance of (2/7)ΔF in the case of the 8-valued FSK modulated signals, so that the reception characteristic can be improved.

Note that the radio paging signal coding control device for realizing this second embodiment is essentially identical to that of the first embodiment shown in FIG. 5, except that the "phase" should be replaced by "logical channel" in this second embodiment.

As described, according to the present invention, it becomes possible to transmit the paging signals such that the number of states of the modulated signals becomes as small as possible by controlling the priority orders of the logical channels to be used for coding the paging signals, without requiring the change of the transmission rate and modulation scheme setting, so that it becomes possible to improve the reception characteristic of the receiver at times where the paging signal traffic amount is not so large, without reducing the number of subscribers that can be accommodated.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A radio paging signal coding control device, comprising:

a processing unit for multiplexing logical channels containing coded paging signals into one frame, and modulating and transmitting a carrier using time series digital signals in which a plurality of frames are time division multiplexed as modulated signals, according to a prescribed transmission rate and an N-valued modulation scheme, where N is an integer; and a control unit for controlling the processing unit by determining logical channels to be used for transmission of paging signals among a plurality of available logical channels, by setting priority orders among said plurality of available logical channels such that a number of states of the modulated signals becomes less than N when paging signal traffic is below a certain level.

2. The device of claim 1, wherein the processing unit uses a 4-valued modulation scheme, and the control unit sets high priority orders to one or two logical channels among four available logical channels such that the modulated signals become equivalent to 2-valued modulated signals.

3. A radio paging signal coding control device, comprising:

a processing unit for multiplexing logical channels containing coded paging signals into one frame, and modulating and transmitting a carrier using time series digital signals in which a plurality of frames are time division multiplexed as modulated signals, according to a prescribed transmission rate and an N-valued modulation scheme, where N is an integer; and a control unit for controlling the processing unit by allocating M logical channels to be used for transmission of paging signals at high priority among a plurality of available logical channels, where M is an integer less than N, such that the paging signals are accommodated in said M logical channels at high priority.

4. The device of claim 3, wherein the processing unit uses a 4-valued modulation scheme, and the control unit allocates one or two logical channels at high priority among four available logical channels such that the modulated signals become equivalent to 2-valued modulated signals.

5. A radio paging signal coding control method, comprising the steps of:

processing paging signals by multiplexing logical channels containing coded paging signals into one frame, and modulating and transmitting a carrier using time series digital signals in which a plurality of frames are time division multiplexed as modulated signals, according to a prescribed transmission rate and an N-valued modulation scheme, where N is an integer; and controlling the processing step by determining logical channels to be used for transmission of paging signals among a plurality of available logical channels, by setting priority orders among said plurality of available logical channels such that a number of states of the modulated signals becomes less than N when paging signal traffic is below a certain level.

6. The method of claim 5, wherein the processing unit uses a 4-valued modulation scheme, and the control unit sets high priority orders to one or two logical channels among four available logical channels such that the modulated signals become equivalent to 2-valued modulated signals.

7. A radio paging signal coding control method, comprising the steps of:

processing paging signals by multiplexing logical channels containing coded paging signals into one frame, and modulating and transmitting a carrier using time series digital signals in which a plurality of frames are time division multiplexed as modulated signals, according to a prescribed transmission rate and an N-valued modulation scheme, where N is an integer; and controlling the processing step by allocating M logical channels to be used for transmission of paging signals at high priority among a plurality of available logical channels, where M is an integer less than N, such that the paging signals are accommodated in said M logical channels at high priority.

8. The device method of claim 7, wherein the processing step uses a 4-valued modulation scheme, and the control step allocates one or two logical channels at high priority among four available logical channels such that the modulated signals become equivalent to 2-valued modulated signals.

* * * * *